United States Patent Office 3,466,294
Patented Sept. 9, 1969

3,466,294
TERTIARY ACETYLENIC ESTERS OF PYRIDINE CARBOXYLIC ACIDS
Seymour Hyden, Spring Valley, Henry Wetstein, Monroe, and Godfrey Wilbert, Carmel, N.Y., assignors to Nepera Chemical Co. Inc.
No Drawing. Continuation-in-part of application Ser. No. 516,772, Dec. 27, 1965. This application Nov. 30, 1967, Ser. No. 686,793
Int. Cl. C07d *31/34;* A01n *9/22*
U.S. Cl. 260—295.5                                                5 Claims

ABSTRACT OF THE DISCLOSURE

Compounds of the formula:

$$\left[ \text{Pyridine}(R_1)(R_2) - \left( \underset{\|}{\overset{O}{C}} - O - \underset{R_4}{\overset{R_3}{\underset{|}{C}}} - C \equiv CH \right)_n \right]$$

and $$\text{Pyridine}(R_1)(R_2) - \underset{\|}{\overset{O}{C}} - O - \underset{R_4}{\overset{R_3}{\underset{|}{C}}} - C \equiv C - \underset{R_6}{\overset{R_5}{\underset{|}{C}}} - O - \underset{\|}{\overset{O}{C}} - \text{Pyridine}(R_2)(R_1)$$

wherein $R_1$ and $R_2$ each represent hydrogen, lower alkyl, halogen, nitro, lower alkoxy or acyl, and $R_3$, $R_4$, $R_5$ and $R_6$ each represent lower alkyl, monohomocyclic aryl such as phenyl, or $R_3$, $R_4$, $R_5$ and $R_6$ taken together with the carbon atom to which they are attached form a cycloalkyl system such as cyclohexyl, and $n$ is from 1 to 2. These compounds are useful as antifungal agents.

---

This application for U.S. Letters Patent is a continuation-in-part application of our copending application Ser. No. 516,772 filed Dec. 27, 1965 now abandoned.

This invention relates to a composition of matter and relates more particularly to compounds of the formula:

$$\left[ \text{Pyridine}(R_1)(R_2) - \left( \underset{\|}{\overset{O}{C}} - O - \underset{R_4}{\overset{R_3}{\underset{|}{C}}} - C \equiv CH \right)_n \right]$$

and $$\text{Pyridine}(R_1)(R_2) - \underset{\|}{\overset{O}{C}} - O - \underset{R_4}{\overset{R_3}{\underset{|}{C}}} - C \equiv C - \underset{R_6}{\overset{R_5}{\underset{|}{C}}} - O - \underset{\|}{\overset{O}{C}} - \text{Pyridine}(R_2)(R_1)$$

wherein $R_1$ and $R_2$ each represent hydrogen, lower alkyl, halogen, nitro, lower alkoxy or acyl and $R_3$, $R_4$, $R_5$ and $R_6$ each represent lower alkyl, monohomocyclic aryl such as phenyl, or $R_3$, $R_4$, $R_5$ and $R_6$ taken together with the carbon atom to which they are attached form a cycloalkyl system such as cyclohexyl and $n$ is from 1 to 2.

As used herein, the term lower alkyl refers to both straight and branched chain alkyls such as methyl, ethyl, isopropyl, and the like. The term halogen includes all four halogens. The term acyl refers to the residue of a carboxylic acid, such as lower alkanoyl acid, for example, acetyl, propionyl, or benzoyl and the like. The term lower alkoxy refers to groups such as methoxy, ethoxy, and the like. The symbols $R_1$, $R_2$, $R_3$, $R_4$, $R_5$ and $R_6$ as used hereinafter have the same meaning as defined.

This invention also relates to a novel method for the production of the above compounds.

The compounds of this invention exhibit antimicrobial activity against organisms such as *Proteus vulgarus* and against fungus such as *Candida albicans* and *T. menta.* They inhibit the growth of susceptible organisms at a concentration of about 250 to 1,000 γ/ml. In use the compounds of this invention are combined with a dermatological acceptable excipient such as talc, vaseline, and the like to form dosage forms such as dusting powder, ointment and the like with the active ingredient being present from about 1–50% by weight. In use these topical applications are liberally applied to sites to inhibit the growth of susceptible organisms or they may be applied to wounds of a host such as mice, cats, dogs and the like as a prophylactic against bacterial or fungus activity.

According to the process of this invention, these compounds are prepared by reacting acetylenic alcohols of the formula:

$$HC \equiv C - \underset{R_4}{\overset{R_3}{\underset{|}{C}}} - OH \quad \text{and} \quad O - \underset{R_4}{\overset{R \; H_3}{\underset{|}{C}}} - C \equiv C - \underset{R_6}{\overset{R_5}{\underset{|}{C}}} - OH$$

with pyridine carboxylic acid chlorides of the formula:

$$\left[ \text{Pyridine}(R_1)(R_2) - \left( \underset{\|}{\overset{O}{C}} - Cl \right)_n \right]$$

This reaction is effected at a temperature of −10° C. to 50° C. in a solvent system comprising pyridine or an alkyl pyridine. A preferred range is at ambient temperature which is from 20 to 35° C. The desired reaction product may be recovered from the reaction mixture by diluting with ice water, followed by extraction with a solvent such as ether if necessary. The crude product may be purified using distillation or crystallization techniques.

In order to further illustrate the practice of this invention, the following examples are given:

EXAMPLE 1

2-ethynyl-2-propyl nicotinate $$\text{Pyridine} - \underset{\|}{\overset{O}{C}} - O - \underset{\underset{CH_3}{|}}{\overset{CH_3}{\underset{|}{C}}} - C \equiv CH$$

8.4 g. of methyl butynol are dissolved in 50 ml. of pyridine at ambient temperature. 16 g. of nicotinyl chloride are added, dropwise, with stirring while maintaining the temperature at 25° C. to 50° C. The reaction mixture, after addition, is stirred one hour and added to 250 ml. of ice water to afford 2-ethynyl-2-propyl nicotinate as a solid product. This product after recrystallization from hexane, has a M.P. of 62–63° C. The infrared spectrum features a band at 1730 cm.$^{-1}$ (C=O).

EXAMPLE 2

2-ethynyl-2-butyl nicotinate $$\text{Pyridine} - \underset{\|}{\overset{O}{C}} - O - \underset{\underset{C_2H_5}{|}}{\overset{CH_3}{\underset{|}{C}}} - C \equiv CH$$

9.8 g. of methyl pentynol are dissolved in 50 ml. of pyridine and cooled to 0° C. 16 g. of nicotinyl chloride are added, dropwise, with stirring while maintaining the temperature at 0° C. to 20° C. The reaction mixture was warmed to 30° C., stirred one hour and added to 200 ml. of ice water to afford 2-ethynyl-2-butyl nicotinate as a solid product. The product after recrystallization from hexane, has a M.P. of 46–48° C. The infrared spectrum features a band at 1730 cm.$^{-1}$ (C=O).

EXAMPLE 3

1-ethynyl-1-cyclohexyl nicotinate

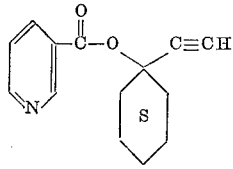

In an analogous manner as described in Example 2, 12.4 g. 1-ethynyl-cyclohexynol and 16 g. nicotinyl-chloride are reacted to give 1-ethynyl-1-cyclohexyl nicotinate which, after recrystallization from hexane, has a M.P. of 72.5–73° C. The infrared spectrum features a band at 1730 cm.$^{-1}$ (C=O).

EXAMPLE 4

2,5-dimethyl-3-hexynyl-2,5-dinicotinate

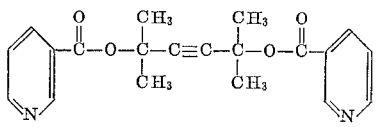

In an analogous manner as described in Example 2, 14.2 g. 2,5-dimethyl-3-hexene-2,5-diol and 32 g. of nicotinyl-chloride are reacted to give 2,5-dimethyl-3-hexynyl-2,5-dinicotinate which, after recrystallization from benzene-hexane, has a M.P. of 113–115° C. The infrared spectrum features a band at 1730 cm.$^{-1}$ (C=O).

We claim:
1. A member selected from the group consisting of compounds of the formula:

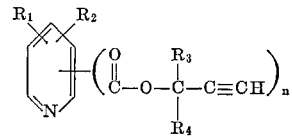

and

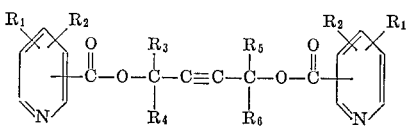

wherein $R_1$ and $R_2$ each represent hydrogen or lower alkyl, and $R_3$, $R_4$, $R_5$ and $R_6$ each represent lower alkyl, phenyl, or $R_3$ and $R_4$, or $R_5$ and $R_6$ taken together with the carbon atom to which they are attached form a cyclohexyl radical, and $n$ is from 1 to 2.

2. The compound of claim 1 which is 2-ethynyl-2-propyl nicotinate.
3. The compound of claim 1 which is 2-ethynyl-2-butyl nicotinate.
4. The compound of claim 1 which is 1-ethynyl-1-cyclohexyl nicotinate.
5. The compound of claim 1 which is 2,5-dimethyl-3-hexynyl-2,5-dinicotinate.

References Cited

UNITED STATES PATENTS 3,284,461  11/1966  Wilbert et al. _____ 260—295

HENRY R. JILES, Primary Examiner
ALAN L. ROTMAN, Assistant Examiner

U.S. Cl. X.R.

260—295, 635; 424—266